US009077268B2

(12) United States Patent
Ishizuki (10) Patent No.: US 9,077,268 B2
(45) Date of Patent: Jul. 7, 2015

(54) CONTROLLER AND VARIABLE-SPEED GENERATOR-MOTOR STARTING METHOD

(75) Inventor: Teruyuki Ishizuki, Tokyo (JP)

(73) Assignee: Kabushiki Kaisha Toshiba (JP)

( * ) Notice: Subject to any disclaimer, the term of this patent is extended or adjusted under 35 U.S.C. 154(b) by 249 days.

(21) Appl. No.: 13/456,661

(22) Filed: Apr. 26, 2012

(65) Prior Publication Data

US 2012/0274289 A1 Nov. 1, 2012

(30) Foreign Application Priority Data

Apr. 28, 2011 (JP) ................................. 2011-102279

(51) Int. Cl.
| H02P 11/00 | (2006.01) |
| H02P 9/08 | (2006.01) |
| H02P 1/50 | (2006.01) |
| H02P 1/52 | (2006.01) |
| H02P 9/14 | (2006.01) |

(52) U.S. Cl.
CPC .. *H02P 9/08* (2013.01); *H02P 1/50* (2013.01); *H02P 1/52* (2013.01); *H02P 9/14* (2013.01)

(58) Field of Classification Search
CPC ............... H02P 1/50; H02P 9/14; H02P 1/52; H02P 1/04; H02P 9/08
USPC ..................................................... 322/11, 29
See application file for complete search history.

(56) References Cited

U.S. PATENT DOCUMENTS

| 3,851,234 | A | * | 11/1974 | Hoffman et al. | ............. | 318/800 |
| 4,708,594 | A | * | 11/1987 | Shinmei et al. | ................. | 417/53 |
| 4,816,696 | A | * | 3/1989 | Sakayori et al. | ................ | 290/52 |
| 4,818,890 | A | * | 4/1989 | Mose et al. | ...................... | 290/52 |
| 5,055,764 | A | * | 10/1991 | Rozman et al. | ................. | 322/10 |
| 5,729,118 | A | * | 3/1998 | Yanagisawa et al. | ........... | 322/29 |
| 5,798,631 | A | * | 8/1998 | Spee et al. | ....................... | 322/25 |
| 6,724,099 | B2 | * | 4/2004 | Klaar | .............................. | 290/52 |
| 6,784,634 | B2 | * | 8/2004 | Sweo | ........................... | 318/727 |
| 6,933,625 | B2 | * | 8/2005 | Feddersen et al. | .............. | 290/44 |
| 6,960,900 | B2 | * | 11/2005 | Fogarty et al. | .................. | 322/29 |
| 6,998,726 | B2 | * | 2/2006 | Sarlioglu et al. | ................ | 290/31 |
| 7,271,500 | B1 | * | 9/2007 | Kimura et al. | .................. | 290/52 |
| 7,453,242 | B2 | * | 11/2008 | Ichinose et al. | ................. | 322/29 |
| 8,111,048 | B2 | * | 2/2012 | Kenzaki et al. | ................. | 322/29 |

(Continued)

FOREIGN PATENT DOCUMENTS

CN 101270723 A 9/2008

OTHER PUBLICATIONS

Publication of Electric Technology Research Association, vol. 57, No. 2, pp. 38-40 (2001).

(Continued)

*Primary Examiner* — Pedro J Cuevas
*Assistant Examiner* — Viet Nguyen
(74) *Attorney, Agent, or Firm* — Harness, Dickey & Pierce, P.L.C.

(57) ABSTRACT

In one embodiment, there is provided a controller that performs control to supply driving electricity to a secondary winding of a variable-speed generator-motor from a secondary exciter and thereby start the variable-speed generator-motor from a standstill state in a variable-speed pumped storage system. The controller performs control to complete a start-up by the driving electricity from the secondary exciter and connect the variable-speed generator-motor in parallel with an electric power system, in a state where a rotating speed of the variable-speed generator-motor is lower than a lower limit speed of a variable-speed operation range.

12 Claims, 8 Drawing Sheets

(56) References Cited

U.S. PATENT DOCUMENTS

2003/0052643 A1  3/2003  Sweo

OTHER PUBLICATIONS

Masahiro Katsuie et al., Toshiba Review, "Tests of 4,000-kW Variable-Speed Pumped Storage Power System", vol. 43, No. 12, p. 3 (1988).

Hitoshi Ohta et al, Toshiba Review, "On-Line Operation of Adjustable-Speed System for Okinawa Yanbaru Seawater Pumpted Storage Power Plant", vol. 54, No. 12, p. 55 (1999).

Chinese Office Action in corresponding Chinese Application No. 201210128673.6 mailed May 4, 2014 and English translation.

Japanese Office Action for Application No. 2011-102279 dated Sep. 30, 2014 with English translation (6 pages).

\* cited by examiner

CONTROLLER AND VARIABLE-SPEED GENERATOR-MOTOR STARTING METHOD

CROSS-REFERENCE TO RELATED APPLICATIONS

This application is based upon and claims the benefit of priority from prior Japanese Patent Application No. 2011-102279, filed Apr. 28, 2011, the entire contents of which are incorporated herein by reference.

FIELD

Embodiments described herein relate generally to a controller and a variable-speed generator-motor starting method for controlling the start of a variable-speed generator-motor, for example, in a pumped storage power plant.

BACKGROUND

According to a generally used method of starting pumping operation, a static starter equipped with a frequency converter including a semiconductor element is used for starting of generator-motor at a large-capacity pumped storage power plant. This starter is used to accelerate the generator-motor to a rated rotating speed from the standstill state to synchronize a generator-motor terminal voltage with a system voltage, and then the generator-motor is connected in parallel with the electric power system by a parallel-in breaker. A thyristor starter is known as such a static starter. The output of the starter of this type is as high as 20 MW, and there are demands to reduce its costs and installation space.

On another front, in an environment marked by the recent countermeasures against global warming, there are increasing cases where a doubly-fed generator-motor (hereinafter referred to as a "variable-speed generator-motor") is applied to a variable-speed pumped storage power plant. When a large-capacity variable-speed generator-motor is applied to a variable-speed pumped storage power plant, a frequency converter (hereinafter referred to as a "secondary exciter") having an output of more than 20 MW may be used for an exciter connected to the rotor winding (secondary winding) of the variable-speed generator-motor. Some variable-speed pumped storage power plants use the following method (hereinafter referred to as a "self-starting method [secondary side]"): The "secondary exciter" is used as a starter without an additionally installed static starter. Variable-frequency driving electricity is put into a variable-speed generator-motor from a secondary winding of the generator motor to accelerate the generator motor to the vicinity of a synchronous speed from a standstill state.

In the "self-starting method [secondary side]", the target speed of synchronizing with and connecting in parallel with the electric power system is greater than or equal to the minimum speed of what is known as a variable-speed operation range.

However, the selected variable-speed operation range of the recent variable-speed pumped storage power plant has decreased to about ±4% from a conventional range of about ±5 to 7% due to its higher head and higher capacity. Therefore, an output frequency range and an output voltage range required for the secondary exciter are also reduced in proportion to the variable-speed operation range. Accordingly, even if the secondary exciter is connected to the secondary winding of the variable-speed generator-motor and used as a starter to supply driving electricity as heretofore, the generator motor cannot be started up to even the minimum speed of the variable-speed operation range due to a low output voltage.

In order to address such a problem, the following methods may be applied. That is, there may be a first method (static starter method) in which the static starter is additionally installed as described above; a second method in which a set of large-current branch circuit buses, disconnectors, and the like are provided, so that the main circuits are switched to inject driving electricity from the starter winding (primary winding) of the generator-motor (self-starting method [primary side]) at its starting; and a third method in which a start-up transformer, a set of large-current branch circuit buses, and disconnectors that are only used at the start are provided on the secondary winding circuit side, so that a secondary voltage at the start is started up, and necessary driving electricity is injected from the secondary winding circuit side (self-starting method [with a secondary start-up transformer]). In each case, large-sized equipments shall be additionally installed. This leads to increased equipment costs, complicated layout design of a power plant, and the increase in size and engineering costs of a building.

Under such circumstances, it is desired to provide a controller and a variable-speed generator-motor starting method whereby when a variable-speed generator-motor is started by a secondary exciter in a variable-speed pumped storage system, the variable-speed generator-motor can be started without increases in equipment size and costs even if the variable-speed generator-motor cannot be started up to the minimum speed of a variable-speed operation range.

DETAILED DESCRIPTION

Embodiments will be described below with reference to the drawings.

In general, according to one embodiment, there is provided a controller that performs control to supply driving electricity to a secondary winding of a variable-speed generator-motor from a secondary exciter and thereby start the variable-speed generator-motor from a standstill state in a variable-speed pumped storage system. The controller performs control to complete a start-up by the driving electricity from the secondary exciter and connect the variable-speed generator-motor in parallel with an electric power system, in a state where a rotating speed of the variable-speed generator-motor is lower than a lower limit speed of a variable-speed operation range.

First Embodiment

Initially, the first embodiment is described.

Figure 1:
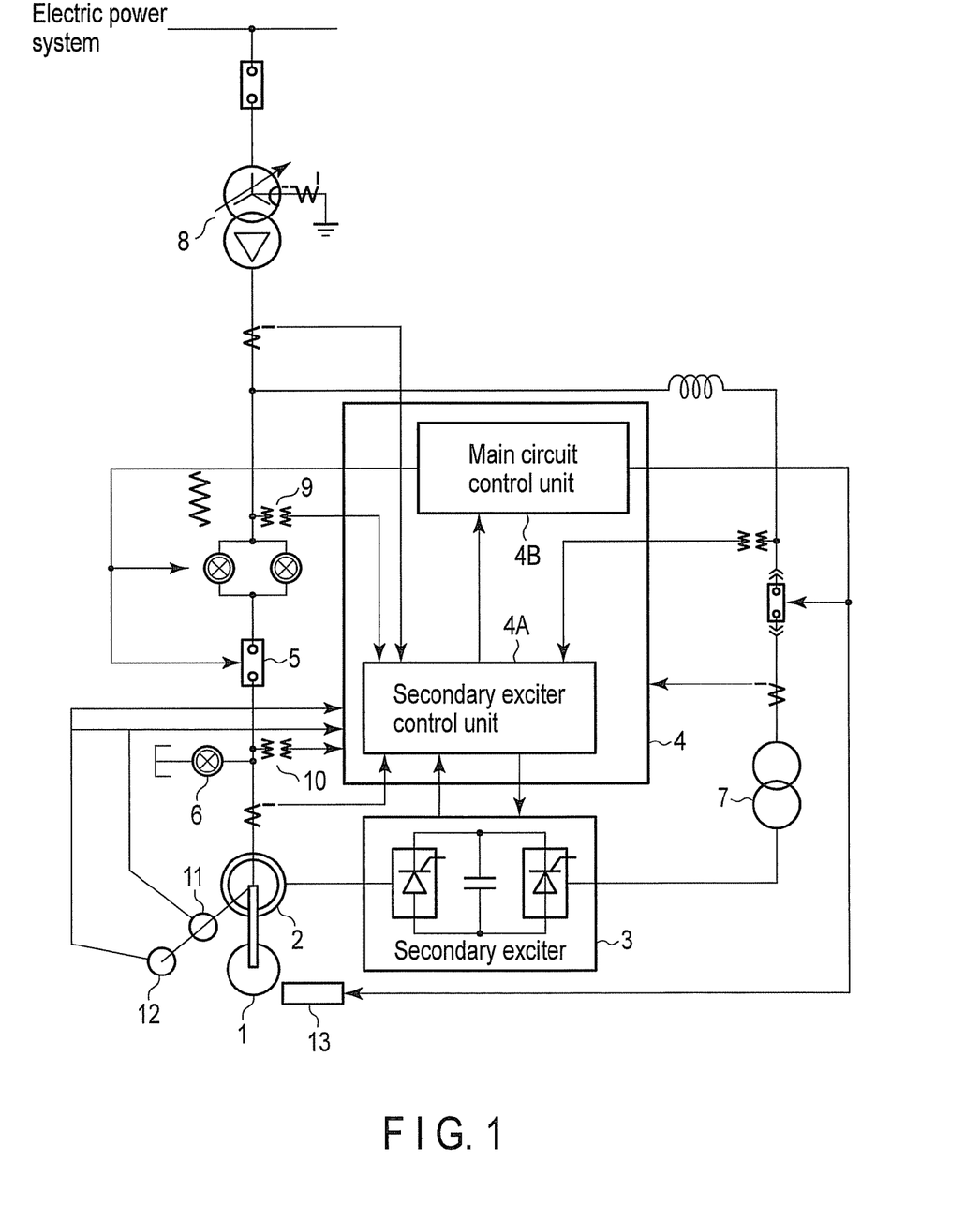
FIG. 1 is a block diagram showing the basic configuration of a variable-speed pumped storage system according to a first embodiment and a second embodiment.

FIG. 1 is a block diagram showing the basic configuration of a variable-speed pumped storage system according to the first embodiment.

The variable-speed pumped storage system includes, as the main elements: a pump turbine 1; a variable-speed generator-motor 2; a secondary exciter 3 which is connected to a secondary winding of the variable-speed generator-motor 2, and is configured by a frequency converter which applies an alternating current having a variable frequency to the variable-speed generator-motor 2; a controller 4 which includes a secondary exciter control unit 4A (which controls the output of alternating voltage, current, frequency, and phase angle of the secondary exciter 3) and a main circuit control unit 4B (which controls the open/close of the circuit breaker 5 and disconnector 6, and controls the operation of the water depressing system 13); a parallel-in breaker 5 for connection of the variable-speed generator-motor 2 to the electric power system; a starting disconnector 6 which causes a three-phase short-circuit at the stator winding terminal of the variable-speed generator-motor 2; an excitation transformer 7 which serves as a power transformer for the secondary exciter 3; a main transformer 8 which is connected to an electric power system via a breaker; an instrument transformer 9 which measures a system side voltage; an instrument transformer 10 which measures the terminal voltage of the variable-speed generator-motor 2; a speed detector 11 which detects the rotating speed (which may be hereinafter abbreviated as "speed") of a rotor of the variable-speed generator-motor 2; a phase detector 12 which detects the phase angle of the rotor of the variable-speed generator-motor 2; and a water depressing system 13 which depresses the water level at the start of pumping.

The controller 4 has a control function to supply driving electricity to the secondary winding of the variable-speed generator-motor 2 from the secondary exciter 3 and thereby start the variable-speed generator-motor 2 from a standstill state. Particularly in the present embodiment, the controller 4 has a control function to complete the start-up by the driving electricity from the secondary exciter 3 to connect the variable-speed generator-motor 2 in parallel with the electric power system, in a state where the speed of the variable-speed generator-motor 2 is lower than the lower limit speed of a variable-speed operation range. More specifically, the speed at which the start-up is completed to connect in parallel with the electric power system is lower than the lower limit speed of the variable-speed operation range, and is greater than or equal to a speed at which one of a secondary voltage and a secondary current in the no-load operation of the variable-speed generator-motor 2 is equal to a maximum output voltage or a maximum output current of the secondary exciter 3.

The reasons for the use of such control are described below in comparison with a conventional technique.

Figure 2:
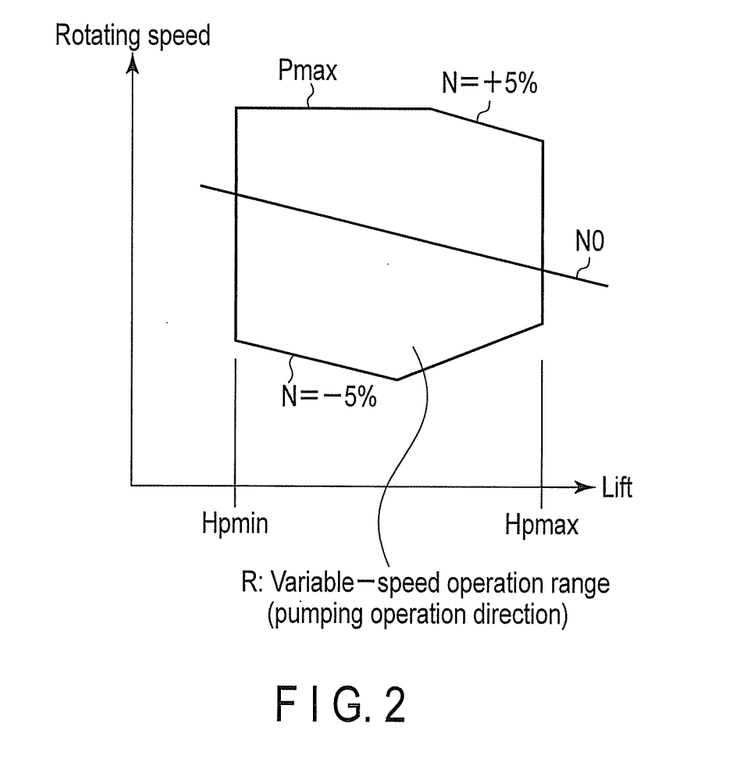
FIG. 2 is an explanatory graph showing a variable-speed operation range.

In general, in the variable-speed pumped storage system, as shown in FIG. 2, a variable-speed operation range R is determined within the maximum pumping head Hpmax and the minimum pumping head Hpmin of the plant, pumping operation characteristics of the pump turbine, a maximum input Pmax required by the turbine operation characteristics, and a minimum input (output), and within upper limit and lower limit speeds of rotating speed ranges (for example, $N=N0\pm5\%$) which are determined to be within the maximum output voltage and maximum output currents as continuous ratings of the frequency converter as secondary exciter. Therefore, stable continuous operation (steady operation) is possible in all regions within the above range.

However, as described above, the variable-speed operation range which has heretofore been about $\pm 5$ to 7% of a rated speed tends to be reduced to about $\pm 4\%$ in recent variable-speed pumped storage systems that use high-head and large-capacity pump turbines, while the required torque for starting increases due to the increased speed of the pump turbine. Therefore, according to the conventional techniques described above, the variable-speed generator-motor serving as an induction motor cannot be accelerated and started up by the secondary exciter to a speed greater than or equal to the lower limit speed of the variable-speed operation range that permits the parallel connection to the electric power system.

Figure 3:
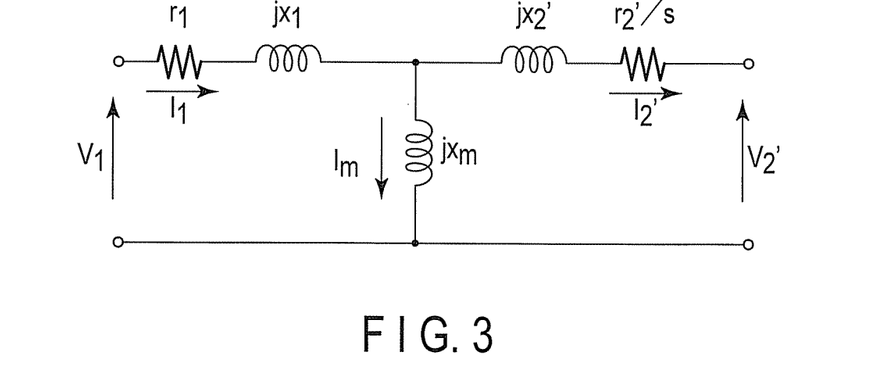
FIG. 3 is an equivalent circuit diagram showing a variable-speed generator-motor 2 that is connected to an electric power system and is in pumping operation.
Figure 4:
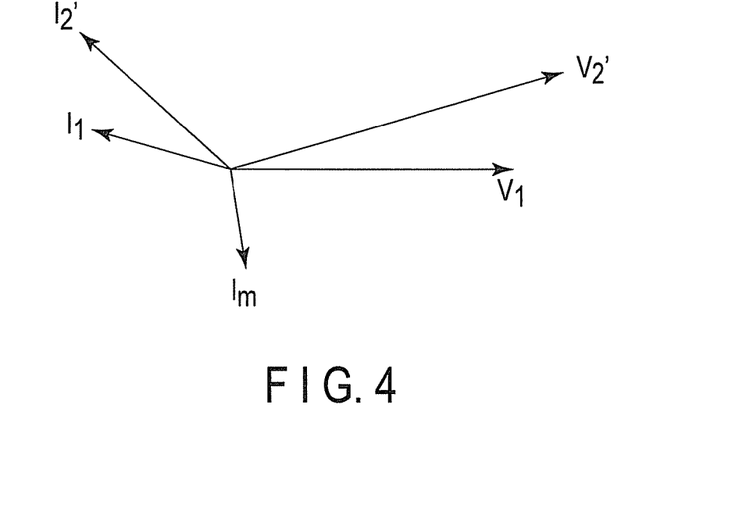
FIG. 4 is a conceptual diagram showing vectors of various currents and voltages shown in FIG. 3.
Figure 5:
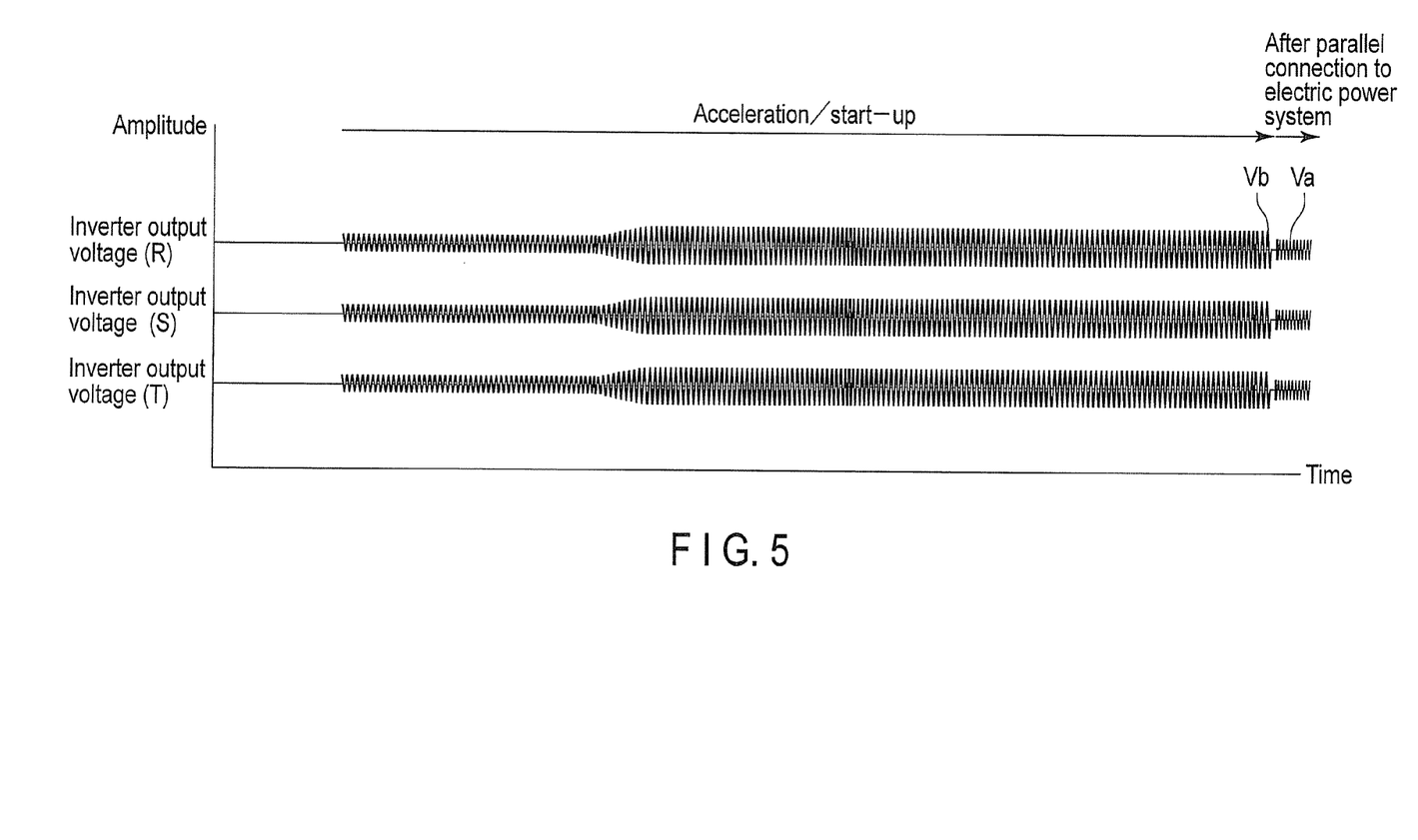
FIG. 5 is a waveform chart of secondary exciter output voltages at the start of pumping operation which are measured in a field test of an existing variable-speed pumped storage system.

In view of these, whether the parallel connection to the electric power system is possible at a speed less than or equal to the lower limit speed of the variable-speed operation range is verified with reference to a mathematical expression and FIG. 3 to FIG. 5.

FIG. 3 shows an equivalent circuit in which the variable-speed generator-motor 2 is connected to the electric power system and is in pumping operation. FIG. 4 shows vectors of various currents and voltages shown in FIG. 3. The mathematical expression below shows a relational expression of the secondary current and the secondary voltage.

$$\dot{I}_2' = (\dot{Z}_1 + \dot{Z}_m)\dot{I}_1/\dot{Z}_m - \dot{V}_1/\dot{Z}_m$$

$$\dot{V}_2' = -(\dot{Z}_1\dot{Z}_2'/\dot{Z}_m + \dot{Z}_1 + \dot{Z}_2')\dot{I}_1 + (\dot{Z}_2' + \dot{Z}_m)\dot{V}_1/\dot{Z}_m$$

where, $$\dot{Z}_1 = r_1 + jx_1$$

$$\dot{Z}_2' = r_2'/s + jx_2'$$

$$\dot{Z}_m = jx_m$$

$$s = (N_0 - N)/N_0$$

$\dot{V}_1$: primary winding voltage (stator winding voltage)
$\dot{V}_2'$: secondary winding voltage (rotor winding voltage) converted to primary side
$\dot{I}_1$: primary winding current
$\dot{I}_2'$: secondary winding current converted to primary side
$r_1$: resistance of primary winding
$r_2'$: resistance of secondary winding converted to primary side
$x_1$: reactance of primary winding
$x_2'$: reactance of secondary winding converted to primary side
$s$=slip
$N_0$: synchronous speed
$N$: rotating speed
Symbol with on character (e.g., $\dot{I}_1$) represents vector quantity.

It is to be noted here that when the start-up of the variable-speed generator-motor 2 is completed and the variable-speed generator-motor 2 is connected in parallel with the electric power system, I1 on the equivalent circuit in FIG. 3 can be theoretically zero if the voltage on the side of the primary winding is synchronized and a load current is controlled such that the load current does not flow.

It is thus understood that the output current/output voltage of the secondary exciter 3 necessary to complete the start-up in the vicinity of the lower limit speed of the variable-speed operation range to achieve synchronization and parallel connection is lower than the output current/output voltage of the secondary exciter necessary for the pumping operation at the lower limit speed of the variable-speed operation range calculated from the operation state after parallel connection to the electric power system.

This phenomenon can be ascertained not only from the above-mentioned theory but also from the results of a field test of an actual variable-speed pumped storage system.

The waveform of secondary exciter output voltages (inverter output voltages [R], [S], and [T]) at the start of pumping operation which are measured in a field test of an existing variable-speed pumped storage system manufactured by the applicant are shown in FIG. 5. It is found out that a secondary exciter output voltage Va during the parallel connection to the electric power system is much lower than a voltage Vb after the completion of the acceleration and start-up and the parallel connection to the electric power system and that the secondary exciter output voltage is enough during the parallel connection to the electric power system.

Thus, according to the present embodiment, the surplus of the output voltage/current of the secondary exciter 3 during the parallel connection to the electric power system is used to increase the slip during the parallel connection to the electric power system to allow the parallel connection to the electric power system at a speed lower than the minimum speed of the variable-speed operation range. That is, the characteristic of the intensity of the secondary voltage of the variable-speed generator-motor 2 that is proportional to the intensity of its slip is used. More specifically, the control-switching set value at which to complete start-up control to allow the parallel connection to the electric power system is set to a value lower than the lower limit value of the variable-speed operation range, so that the parallel connection to the electric power system is achieved at a speed lower than the lower limit speed of the variable-speed operation range. After achieving the parallel connection to the electric power system, electric energy is received from the electric power system to accelerate and start-up the speed to a speed greater than or equal to the lower limit speed of the variable-speed operation range which is the speed range of a continuous operation range after the parallel connection to the electric power system, thereby enabling the shift to the pumping operation.

Figure 6:
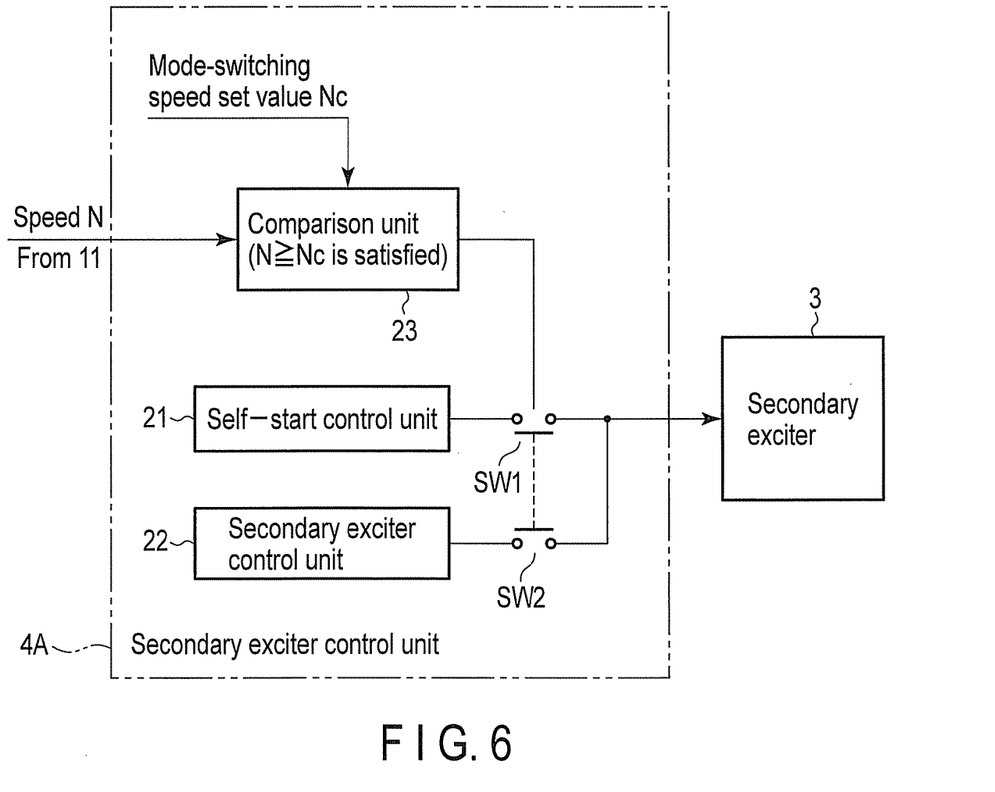
FIG. 6 is a diagram showing one configuration example of a secondary exciter control unit 4A according to the first embodiment.

One configuration example of the secondary exciter control unit 4A according to the first embodiment is shown in FIG. 6.

The secondary exciter control unit 4A shown in FIG. 6 includes a self-start control unit 21, a secondary exciter control unit 22, a comparison unit 23, and switches SW1 and SW2.

When a signal from the comparison unit 23 is off, switches SW1 and SW2 are on and off, respectively, and a signal output from the self-start control unit 21, between the self-start control unit 21 and the secondary exciter control unit 22, is supplied to the secondary exciter 3. On the other hand, when the signal from the comparison unit 23 is on, switches SW1 and SW2 are turned off and on, respectively, and a signal output from the secondary exciter control unit 22, between the self-start control unit 21 and the secondary exciter control unit 22, is supplied to the secondary exciter 3.

The self-start control unit 21 is a function for executing a control mode (hereinafter referred to as a "self-start control mode") that uses the secondary exciter 3 as a starter to start the variable-speed generator-motor 2 (and the pump turbine 1). When switch SW1 is on, the control signal of the self-start control unit 21 is sent to the secondary exciter 3. This control signal gradually increases the output frequency of the secondary exciter (frequency converter) 3 to the vicinity of a system frequency from 0 Hz.

The secondary exciter control unit 22 is a function for executing a control mode (hereinafter referred to as a "secondary excitation control mode") to control variable-speed operation during and after the parallel connection of the variable-speed generator-motor 2 to the electric power system through the secondary exciter 3. When switch SW2 is on, the control signal of the secondary exciter control unit 22 is sent to the secondary exciter 3.

A predetermined mode-switching speed set value Nc is saved in a storage of the secondary exciter control unit 4A. This set value may be configured to be taken in from the outside of the secondary exciter control unit 4A. The mode-switching speed set value Nc is defined as a value of the speed N of the rotor of the variable-speed generator-motor 2 at which the control mode is switched to the secondary excitation control mode from the self-start control mode. That is, the mode-switching speed set value Nc is defined as a speed of the rotor of the variable-speed generator-motor 2 at which the start-up by the driving electricity from the secondary exciter 3 is completed to connect the variable-speed generator-motor 2 in parallel with the electric power system.

The comparison unit 23 compares the speed N detected by the speed detector 11 with the mode-switching speed set value Nc, and keeps off an output signal until the speed N reaches the mode-switching speed set value Nc. In this period, switch SW1 is on, and switch SW2 is off, so that the control signal from the self-start control unit 21 is sent to the secondary exciter 3, and the self-start control mode is executed. On the other hand, when the speed N has reached the mode-switching speed set value Nc (when the speed N is greater than or equal to the mode-switching speed set value Nc), the comparison unit 23 turns on an output signal. As a result, switch SW1 is off, and switch SW2 is on, so that the control signal from the secondary exciter control unit 22 is sent to the secondary exciter 3, and the secondary excitation control mode is executed.

In particular, the mode-switching speed set value Nc is set to be lower than the lower limit speed of the variable-speed operation range as described above and to be greater than or equal to the speed at which one of the secondary voltage and the secondary current in the no-load operation of the variable-speed generator-motor 2 is equal to the maximum output voltage or maximum output current of the secondary exciter 3.

For example, when the system frequency is 50 Hz and the variable-speed operation range is 428.6 [rpm]±5%, the mode-switching speed set value Nc which has heretofore been set to a value of 428.6×0.95=407.17 [rpm] or more is set to a value of less than 407.17 [rpm] in the present embodiment. Moreover, when the speed at which one of the secondary voltage and the secondary current in the no-load operation of the variable-speed generator-motor 2 is equal to the maximum output voltage or maximum output current of the secondary exciter 3 is, for example, 428.6 [rpm]−10% (i.e., 428.6 [rpm]×0.9=385.74 [rpm]), the mode-switching speed set value Nc is set to a value of 385.74 [rpm] or more in the present embodiment. For example, when the mode-switching speed set value Nc is set to 385.74 [rpm], the control mode can be switched to the secondary excitation control mode from the self-start control mode in the shortest time after starting processing has begun. Thus, the parallel connection to the electric power system is possible at a lower rotating speed, and the starting time can be further reduced.

Now, an example of the operation by the controller 4 is described with reference to FIG. 7.

When the variable-speed generator-motor 2 (and the pump turbine 1) is in standstill, the controller 4 begins the start of the variable-speed generator-motor 2 (and the pump turbine 1) in response to a starting operation (step S1). In this starting, the controller 4 enables the main circuit control unit 4B to open the parallel-in breaker 5 and close the starting disconnector 6 such that the variable-speed generator-motor 2 serves as an induction motor. The controller 4 enables the secondary exciter control unit 4A to execute the self-start control mode such that the secondary exciter 3 operates as a driver for outputting a variable frequency/variable voltage. Thus, the alternating output of the secondary exciter 3 is changed to the vicinity of the system frequency from substantially 0 Hz, so that the variable-speed generator-motor 2 is accelerated and started up (step S2).

The controller 4 compares the speed N of the variable-speed generator-motor 2 with the mode-switching speed set value Nc (step S3). When the speed N has reached the mode-switching speed set value Nc (N≥Nc is satisfied), the controller 4 switches the control mode from the self-start control mode to the secondary excitation control mode (step S4). That is, the controller 4 enables the secondary exciter control unit 4A to open the starting disconnector 6 in a state where the speed N of the variable-speed generator-motor 2 is lower than the lower limit speed of the variable-speed operation range. The controller 4 then enables the secondary exciter control unit 4A to control the alternating output voltage, current, frequency, and phase of the secondary exciter 3 such that the terminal voltage of the variable-speed generator-motor 2 measured by the instrument transformer 10 is synchronized with the electric power system measured by the instrument transformer 9. After ascertaining the synchronization, the controller 4 enables the secondary exciter control unit 4A to close the parallel-in breaker 5 and connect the variable-speed generator-motor 2 in parallel with the electric power system (step S5).

After the electric power system connection, the controller 4 enables the secondary exciter control unit 4A to accelerate the variable-speed generator-motor 2 by the secondary exciter 3 and the driving electricity from the electric power system such that the variable-speed generator-motor 2 is started up to the variable-speed operation range. The controller 4 also enables the main circuit control unit 4B to operate the water depressing system 13 and start the pumping operation that uses the pump turbine 1 (step S6).

According to the first embodiment, the speed at which the start-up is completed to connect in parallel with the electric power system is lower than the lower limit speed of the variable-speed operation range, and is greater than or equal to a speed at which one of the secondary voltage and the secondary current in the no-load operation of the variable-speed generator-motor 2 is equal to the maximum output voltage or the maximum output current of the secondary exciter 3. Thus, even if the variable-speed generator-motor cannot be started up to the lower limit speed of the variable-speed operation range, the variable-speed generator-motor can be started without increases in equipment size and costs.

Furthermore, as the parallel connection to the electric power system is possible at a speed lower than the lower limit speed of the variable-speed operation range of the variable-speed pumped storage system, the required torque for starting of the variable-speed generator-motor 2 and the pump turbine 1 is lower. The required torque for starting of the variable-speed generator-motor 2 and the pump turbine 1 mainly consists of a term proportional to the square of the rotating speed and a term proportional to the cube of the rotating speed. Therefore, when the parallel connection to the electric power system is possible at a low rotating speed, it is very effective to reduce reducing starting torque required for the starter.

Still further, torque output of the secondary exciter 3 required when it is used as a starter is low. Accordingly, the use of the secondary exciter 3 as a starter enables the parallel connection to the electric power system even in the case where the variable-speed operation range is small, and the output torque of the secondary exciter is insufficient for acceleration to the lower limit speed of the variable-speed operation range as compared with the required starting torque of the generator-motor and pump-turbine like in high-speed and large-capacity project.

Still further, there is no need for a separately installed static starter or a starting transformer. This can reduce equipment costs and a large space for installing the equipment, which is considerably effective particularly in reducing the engineering and excavating costs of recent underground power plants. Moreover, the disposal of waste soil on the ground is reduced, which is a great contribution to the global environment.

Still further, the parallel connection to the electric power system is possible at a lower rotating speed, so that the starting time can be reduced.

As understood from the above explanation, there is a clear distinction between the present embodiment and the conventional concept of starting to reach the speed range of actual operation. The present embodiment is based on the discovery through the performance of using the secondary exciter as a starter in the variable-speed pumped storage system. Accordingly, while the conventional designing technique remains in use, the limit that permits the use of the secondary exciter as a starter can be extended.

The secondary exciter which is a function specific to the variable-speed pumped storage system is used such that acceleration is possible even after the parallel connection to the electric power system. A load current can be controlled to be substantially zero during the parallel connection to the electric power system. Thus, the speed of attaining the parallel connection to the electric power system can be lower than the lower limit speed of the variable-speed operation range. According to a new conception that organically combines these factors, problems that cannot be solved if the conventional designing technique is followed and if the starter and exciter are separately considered can be solved.

Modification of the First Embodiment

Modifications may be properly made to the first embodiment described above without departing from the spirit thereof. For example, in the case shown by way of example in the first embodiment, attention is focused on the rotating speed of the variable-speed generator-motor 2 to achieve control. When the rotating speed of the variable-speed generator-motor 2 is lower than the lower limit speed of the variable-speed operation range, the start-up by the driving electricity from the secondary exciter 3 is completed such that the variable-speed generator-motor 2 is connected in parallel with the electric power system. However, there is no need to limit to such control.

Instead of the rotating speed of the variable-speed generator-motor 2, attention may be focused on, for example, the output frequency of the secondary exciter (frequency converter) 3 in the self-start control mode to achieve control. When the output frequency of the secondary exciter 3 is lower than the output frequency (output frequency that achieves the lower limit speed of the variable-speed operation range) equivalent to the lower limit speed of the variable-speed operation range, the start-up by the driving electricity from the secondary exciter 3 is completed such that the variable-speed generator-motor 2 is connected in parallel with the electric power system.

In this case, more specifically, the output frequency of the secondary exciter 3 is lower than the output frequency equivalent to the lower limit speed of the variable-speed operation range, and is greater than or equal to the output frequency equivalent to the speed at which one of the secondary voltage and the secondary current in the no-load operation of the variable-speed generator-motor 2 is equal to the maximum output voltage or the maximum output current of the secondary exciter 3.

Furthermore, instead of the above-mentioned mode-switching speed set value Nc, a mode-switching output frequency set value is used to determine the value of the output frequency of the secondary exciter 3 at which the control mode is switched from the self-start control mode to the secondary excitation control mode. This mode-switching output frequency set value is set to be lower than the output frequency equivalent to the lower limit speed of the variable-speed operation range as described above and to be greater than or equal to the output frequency equivalent to the speed at which one of the secondary voltage and the secondary current in the no-load operation of the variable-speed generator-motor 2 is equal to the maximum output voltage or the maximum output current of the secondary exciter 3. The output frequency of the secondary exciter 3 is then compared with the mode-switching output frequency set value. If the output frequency of the secondary exciter 3 has reached the mode-switching output frequency set value (when the output frequency of the secondary exciter 3 is greater than or equal to the mode-switching output frequency set value), the control mode can be switched from the self-start control mode to the secondary excitation control mode.

Second Embodiment

Now, the second embodiment is described. The same parts as those in the above first embodiment are not described, and different parts are mainly described below.

The basic configuration of a variable-speed pumped storage system according to the second embodiment is similar to that shown in FIG. 1 used in the first embodiment. The second embodiment is different from the first embodiment in a controller 4, particularly in the configuration and operation of a secondary exciter control unit 4A.

While the control mode is switched in accordance with the speed of the variable-speed generator-motor 2 in the first embodiment, the control mode is switched in accordance with the slip frequency of a secondary exciter 3 relative to a variable-speed generator-motor 2 in the second embodiment.

That is, the controller 4 according to the second embodiment has a control function to complete the start-up by the driving electricity from the secondary exciter 3 to connect the variable-speed generator-motor 2 in parallel with the electric power system, in a state where the slip frequency exceeds the maximum slip frequency of the variable-speed operation range. More specifically, the slip frequency at which the start-up is completed to connect in parallel with the electric power system is higher than the maximum slip frequency of the variable-speed operation range and is less than or equal to the slip frequency at which one of the secondary voltage and the secondary current in the no-load operation of the variable-speed generator-motor 2 is equal to the maximum output voltage or the maximum output current of the secondary exciter 3.

Figure 8:
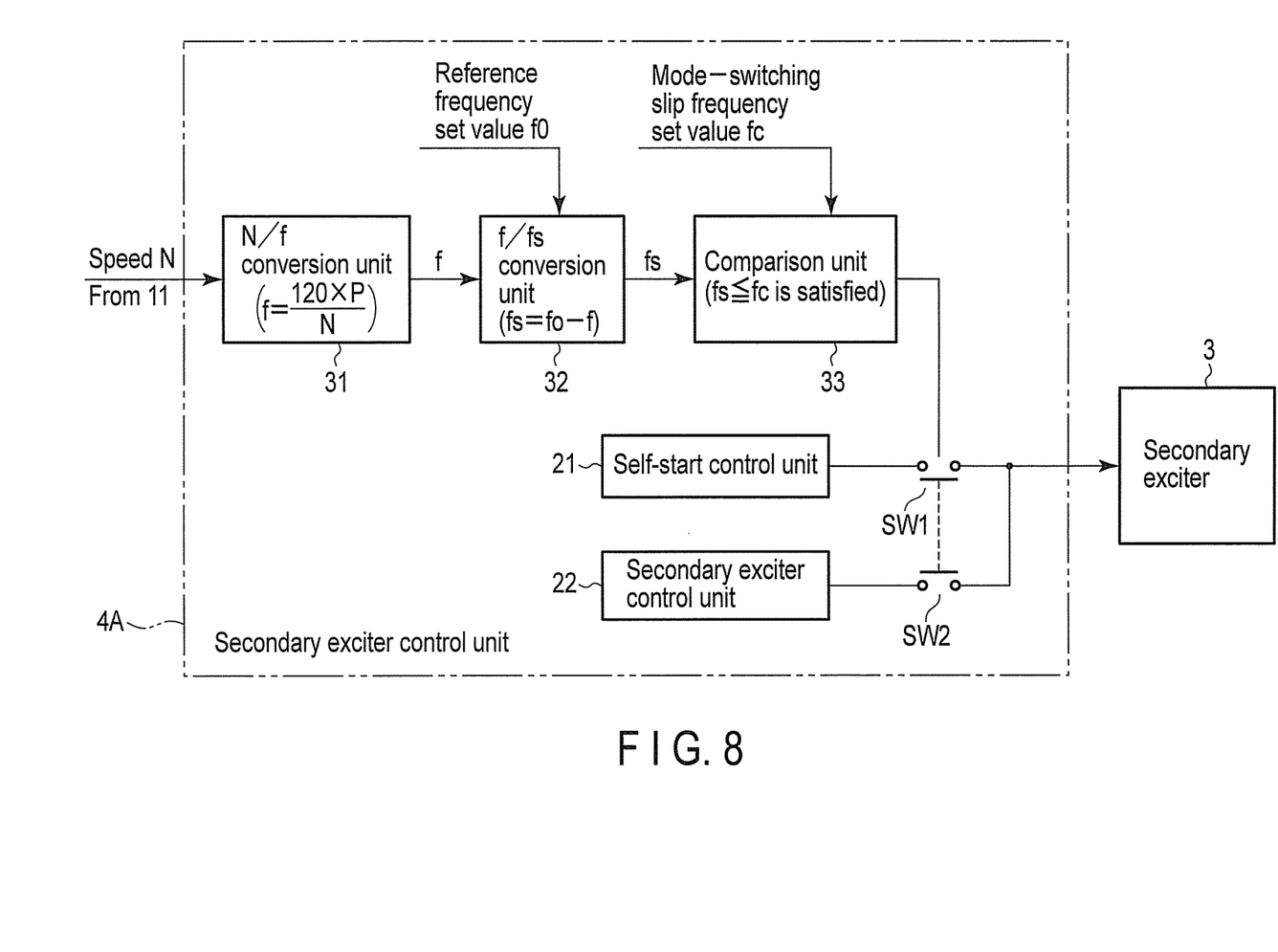
FIG. 8 is a diagram showing one configuration example of a secondary exciter control unit 4A according to the second embodiment.

One configuration example of the secondary exciter control unit 4A according to the second embodiment is shown in FIG. 8. The same components as those in FIG. 6 are provided with the same reference signs.

The secondary exciter control unit 4A shown in FIG. 8 includes a self-start control unit 21, a secondary exciter control unit 22, an N/f conversion unit 31, an f/fs conversion unit 32, a comparison unit 33, and switches SW1 and SW2.

The self-start control unit 21, the secondary exciter control unit 22, and switches SW1 and SW2 are similar to those that have been described above.

A predetermined reference frequency set value f0 and a mode-switching slip frequency set value fc are saved in a storage unit of the secondary exciter control unit 4A. These set values may be configured to be taken in from the outside of the secondary exciter control unit 4A. The reference frequency set value f0 is defined as a reference frequency of the electric power system. The mode-switching slip frequency set value fc is defined as a slip frequency fs at which the control mode is switched to the secondary excitation control mode from the self-start control mode. That is, the mode-switching slip frequency set value fc is defined as a slip frequency at which the start-up by the driving electricity from the secondary exciter 3 is completed to connect the variable-speed generator-motor 2 in parallel with the electric power system.

The N/f conversion unit 31 uses an operational expression "$f=(120 \times P)/N$" (P: number of poles) to calculate a frequency f from the speed N detected by the speed detector 11, and outputs this frequency f.

The f/fs conversion unit 32 uses an operational expression "$fs=f0-f$" to calculate a slip frequency fs from the frequency f output from the conversion unit 31 and the reference frequency set value f0, and outputs this slip frequency fs.

The comparison unit 33 compares the slip frequency fs output from the f/fs conversion unit 32 with the mode-switching slip frequency set value fc, and keeps off an output signal until the slip frequency fs reaches the mode-switching slip frequency set value fc. In this period, switch SW1 is on, and switch SW2 is off, so that the control signal from the self-start control unit 21 is sent to the secondary exciter 3, and the self-start control mode is executed. On the other hand, when the slip frequency fs has reached the mode-switching slip frequency set value fc (when the slip frequency fs is less than or equal to the mode-switching slip frequency set value fc), the comparison unit 33 turns on an output signal. As a result, switch SW1 is off, and switch SW2 is on, so that the control signal from the secondary exciter control unit 22 is sent to the secondary exciter 3, and the secondary excitation control mode is executed.

In particular, the mode-switching slip frequency set value fc is set to be higher than the maximum slip frequency of the variable-speed operation range as described above and to be less than or equal to the slip frequency at which one of the secondary voltage and the secondary current in the no-load operation of the variable-speed generator-motor 2 is equal to the maximum output voltage or maximum output current of the secondary exciter 3.

(Modification 1)

Figure 9:
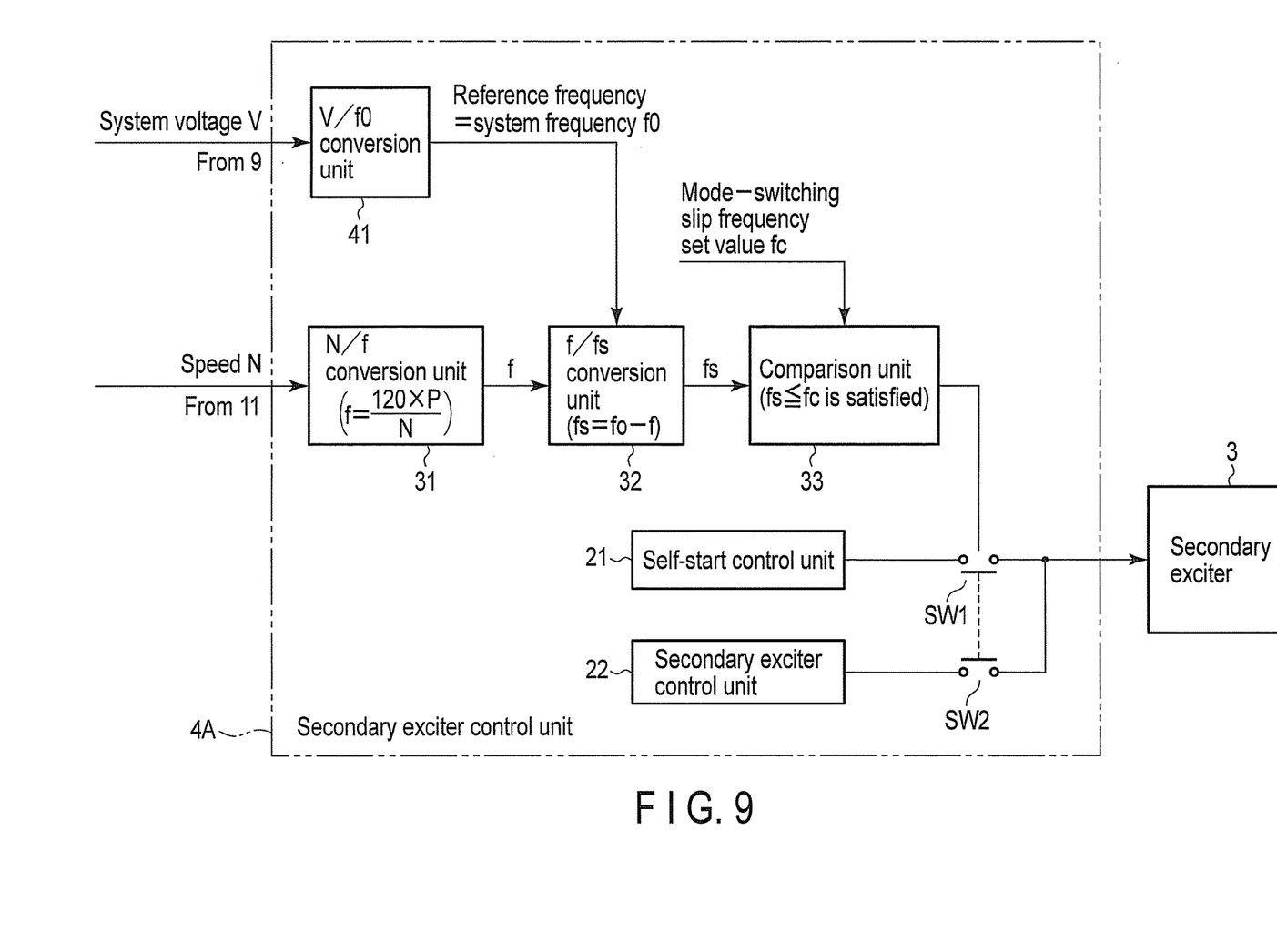
FIG. 9 is a diagram showing another configuration example of the secondary exciter control unit 4A according to the second embodiment.

FIG. 9 shows another configuration example of the secondary exciter control unit 4A according to the second embodiment. The same components as those in FIG. 8 are provided with the same reference signs.

The secondary exciter control unit 4A shown in FIG. 9 includes a self-start control unit 21, a secondary exciter control unit 22, an N/f conversion unit 31, an f/fs conversion unit 32, a comparison unit 33, a V/F0 conversion unit 41, and switches SW1 and SW2.

The self-start control unit 21, the secondary exciter control unit 22, the N/f conversion unit 31, the f/fs conversion unit 32, the comparison unit 33, and switches SW1 and SW2 are similar to those that have been described above.

The V/F0 conversion unit 41 acquires the reference frequency set value f0 from a system voltage V measured by an instrument transformer 9, and outputs this reference frequency set value f0. The output reference frequency set value f0 is supplied to the f/fs conversion unit 32.

(Modification 2)

Figure 10:
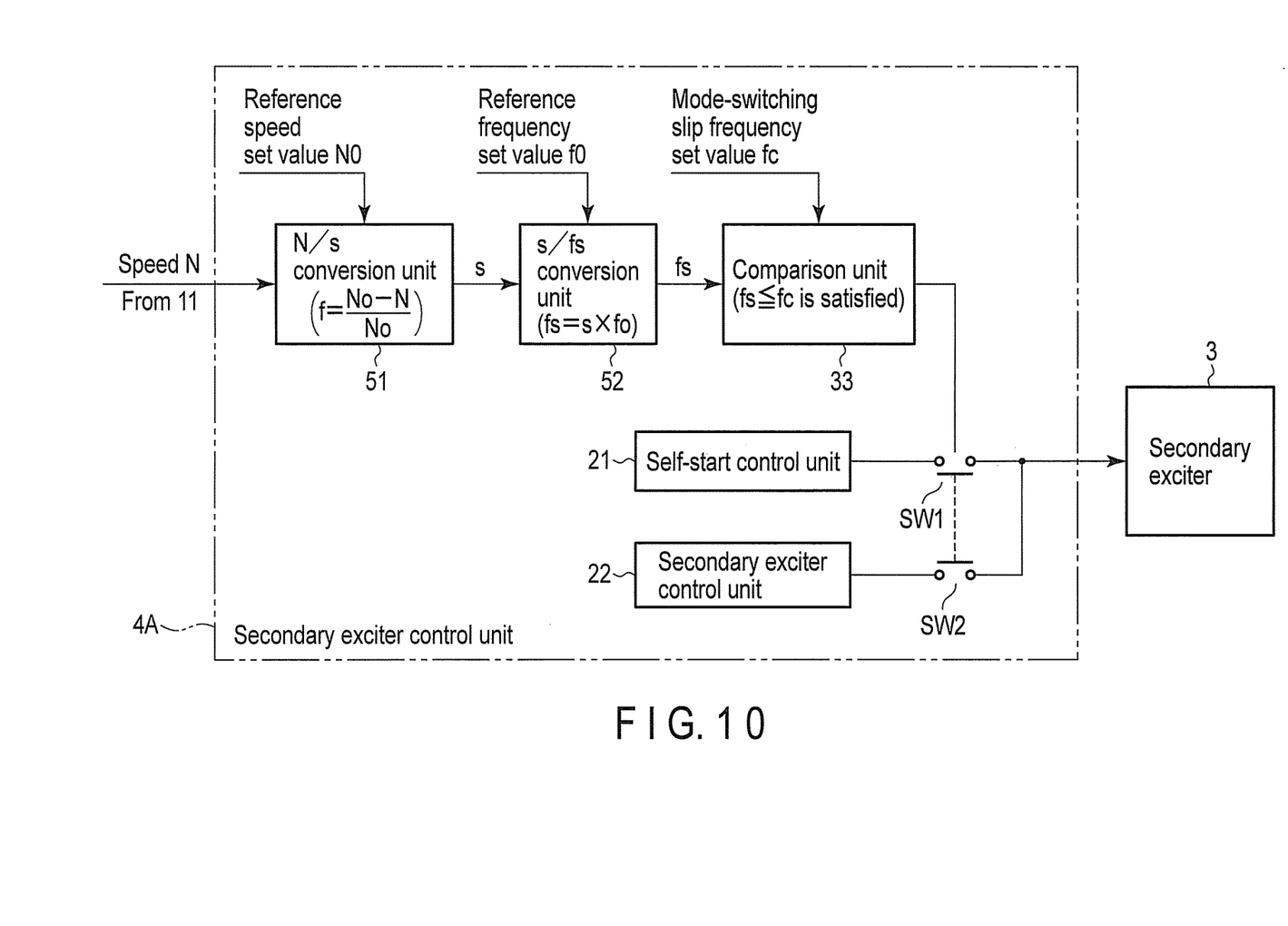
FIG. 10 is a diagram showing still another configuration example of the secondary exciter control unit 4A according to the second embodiment.

FIG. 10 shows still another configuration example of the secondary exciter control unit 4A according to the second embodiment. The same components as those in FIG. 8 are provided with the same reference signs.

The secondary exciter control unit 4A shown in FIG. 10 includes a self-start control unit 21, a secondary exciter control unit 22, an N/s conversion unit 51, an s/fs conversion unit 52, a comparison unit 33, and switches SW1 and SW2.

The self-start control unit 21, the secondary exciter control unit 22, the comparison unit 33, and switches SW1 and SW2 are similar to those that have been described above.

A predetermined reference speed set value N0 is saved in a storage unit of the secondary exciter control unit 4A in addition to the reference frequency set value f0 and the mode-switching slip frequency set value fc that have been mentioned above. The reference speed set value N0 is defined as a reference speed of the variable-speed generator-motor 2.

The N/s conversion unit 51 uses an operational expression "s=(N0−N)/N0" to calculate a slip s from the speed N detected by the speed detector 11 and the reference speed set value N0, and outputs this slip s.

The s/fs conversion unit 52 uses an operational expression "fs=s×f0" to calculate a slip frequency fs from the slip s output from the N/s conversion unit 51 and the reference frequency set value f0, and outputs this slip frequency fs.

Figure 7:
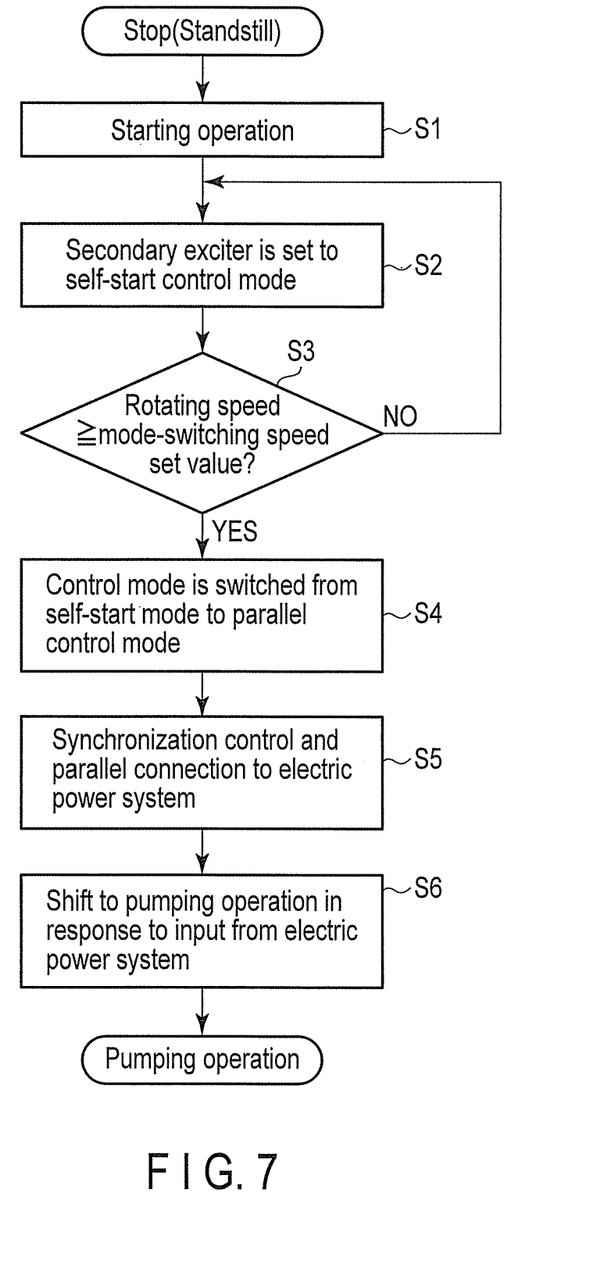
FIG. 7 is a flowchart showing an example of the operation by a controller 4.

The operation of the controller 4 according to the second embodiment is similar to that shown in FIG. 7. Steps other than steps S3 and S4 are similar to those in the first embodiment and are therefore not described.

In step S3, the controller 4 compares the slip frequency fs with the mode-switching slip frequency set value fc. When the slip frequency fs has reached the mode-switching slip frequency set value fc (fs≤fc is satisfied), the controller 4 switches the control mode from the self-start control mode to the secondary excitation control mode (step S4).

According to the second embodiment, the slip frequency at which the start-up is completed to connect in parallel with the electric power system is higher than the maximum slip frequency of the variable-speed operation range, and is greater than or equal to a speed at which one of the secondary voltage and the secondary current in the no-load operation of the variable-speed generator-motor 2 is equal to the maximum output voltage or the maximum output current of the secondary exciter 3. Thus, even if the variable-speed generator-motor cannot be started up to the lower limit speed of the variable-speed operation range, the variable-speed generator-motor can be started without increases in equipment size and costs.

In addition, advantageous effects similar to the various advantageous effects described in the first embodiment are obtained.

As described above in detail, according to the embodiments, it is possible to provide a controller and a variable-speed generator-motor starting method that enable a variable-speed generator-motor to be started without increases in equipment size and costs even if the variable-speed generator-motor cannot be started up to the lower limit speed of the variable-speed operation range when the variable-speed generator-motor is started by a secondary exciter in a variable-speed pumped storage system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A controller that performs control to supply driving electricity to a secondary winding of a variable-speed generator-motor from a secondary exciter and thereby start the variable-speed generator-motor from a standstill state in a variable-speed pumped storage system including a breaker that causes a connection of the variable-speed generator-motor to an electric power system, and a disconnector that causes a three-phase short-circuit at a stator winding terminal of the variable-speed generator-motor, the controller comprising:
 a control unit that performs control to open the breaker and close the disconnector such that the variable-speed generator-motor serves as an induction motor, execute a self-start mode to accelerate and start up the variable-speed generator-motor, and when a rotating speed of the variable-speed generator-motor has reached a preset value, switch a control mode from the self-start mode to a secondary excitation control mode, in which the control unit performs control to open the disconnector in a state where a rotating speed of the variable-speed generator-motor is lower than a lower limit speed of a variable-speed operation range, control the secondary exciter to synchronize a terminal voltage of the variable-speed generator-motor with the electric power system, and after ascertaining the synchronization, close the breaker, to thereby complete a start-up by the driving electricity from the secondary exciter and connect the variable-speed generator-motor in parallel with the electric power system.

2. The controller according to claim 1, wherein the rotating speed at which the start-up is completed is lower than the lower limit speed of the variable-speed operation range, and is greater than or equal to a speed at which one of a secondary voltage and a secondary current in no-load operation of the variable-speed generator-motor is equal to a maximum output voltage or a maximum output current of the secondary exciter.

3. The controller according to claim 1, wherein an output voltage of the secondary exciter is enough during a parallel connection to the electric power system, and the controller performs control to use a surplus of an output or current of the secondary exciter during the parallel connection to the electric power system to increase the slip during the parallel connection to the electric power system, to thereby allow the parallel connection to the electric power system at a speed lower than the minimum speed of the lower limit speed of the variable-speed operation range.

4. A controller that performs control to supply driving electricity to a secondary winding of a variable-speed generator-motor from a secondary exciter and thereby start the variable-speed generator-motor from a standstill state in a variable-speed pumped storage system including a breaker which causes a connection of the variable-speed generator-motor to an electric power system and a disconnector which causes a three-phase short-circuit at a stator winding terminal of the variable-speed generator-motor, the controller comprising:

a control unit that performs control to open the breaker and close the disconnector such that the variable-speed generator-motor serves as an induction motor, execute a self-start mode to accelerate and start up the variable-speed generator-motor, and when an output frequency of the secondary exciter has reached a present value, switch a control mode from the self-start mode to a secondary excitation control mode, in which the control unit performs control to open the disconnector in a state when a rotating speed of the variable-speed generator-motor is lower than a lower limit speed of a variable-speed operation range, control the secondary exciter to synchronize a terminal voltage of the variable-speed generator-motor with the electric power system, and after ascertaining the synchronization, close the breaker, to thereby complete a start-up by the driving electricity from the secondary exciter and connect the variable-speed generator-motor in parallel with the electric power system.

5. The controller according to claim 4, wherein an output voltage of the secondary exciter is enough during a parallel connection to the electric power system, and the controller performs control to use a surplus of an output or current of the secondary exciter during the parallel connection to the electric power system to increase the slip during the parallel connection to the electric power system, to thereby allow the parallel connection to the electric power system at a speed lower than the minimum speed of the lower limit speed of the variable-speed operation range.

6. A controller that performs control to supply driving electricity to a secondary winding of a variable-speed generator-motor from a secondary exciter and thereby start the variable-speed generator-motor from a standstill state in a variable-speed pumped storage system including a breaker which causes a connection of the variable-speed generator-motor to an electric power system and a disconnector which causes a three-phase short-circuit at a stator winding terminal of the variable-speed generator-motor, the controller comprising:

a control unit that performs control to open the breaker and close the disconnector such that the variable-speed generator-motor serves as an induction motor, execute a self-start mode to accelerate and start up the variable-speed generator-motor, and when a slip frequency of the secondary exciter which is obtainable from a rotating speed of the variable-speed generator-motor and a reference frequency of the electric power system has reached a preset value, switch a control mode from the self-start mode to a secondary excitation control mode, in which the control unit performs control to open the disconnector in a state when a rotating speed of the variable-speed generator-motor is lower than a lower limit speed of a variable-speed operation range, control the secondary exciter to synchronize a terminal voltage of the variable-speed generator-motor with the electric power system, and after ascertaining the synchronization, close the breaker, to thereby complete a start-up by the driving electricity from the secondary exciter and connect the variable-speed generator-motor in parallel with the electric power system.

7. The controller according to claim 6, wherein the slip frequency of the secondary exciter at which the start-up is completed is higher than the maximum slip frequency of the variable-speed operation range, and is less than or equal to a slip frequency at which one of a secondary voltage and a secondary current in no-load operation of the variable-speed generator-motor is equal to a maximum output voltage or a maximum output current of the secondary exciter.

8. The controller according to claim 6, wherein an output voltage of the secondary exciter is enough during a parallel connection to the electric power system, and the controller performs control to use a surplus of an output or current of the secondary exciter during the parallel connection to the electric power system to increase the slip during the parallel connection to the electric power system, to thereby allow the parallel connection to the electric power system at a speed lower than the minimum speed of the lower limit speed of the variable-speed operation range.

9. A variable-speed pumped storage system comprising the controller according to any one of claims 1 to 7.

10. A variable-speed generator-motor starting method of supplying driving electricity to a secondary winding of a variable-speed generator-motor from a secondary exciter and thereby starting the variable-speed generator-motor from a standstill state in a variable-speed pumped storage system including a breaker which causes a connection of the variable-speed generator-motor to an electric power system and a disconnector which causes a three-phase short-circuit at a stator winding terminal of the variable-speed generator-motor, the method comprising:

performing control by a controller to open the breaker and close the disconnector such that the variable-speed generator-motor serves as an induction motor, execute a self-start mode to accelerate and start up the variable-speed generator-motor, and when a rotating speed of the variable-speed generator-motor has reached a preset value, switch a control mode from the self-start mode to a secondary excitation control mode, in which the control unit performs control to open the disconnector in a state when a rotating speed of the variable-speed generator-motor is lower than a lower limit speed of a variable-speed operation range, control the secondary exciter to synchronize a terminal voltage of the variable-speed generator-motor with the electric power system, and after ascertaining the synchronization, close the breaker, to thereby complete a start-up by the driving electricity from the secondary exciter and connect the variable-speed generator-motor in parallel with the electric power system.

11. A controller for a variable-speed pumped storage system including a secondary exciter and a variable-speed generator-motor, the controller comprising;

a main circuit control unit configured to control opening and closing of a circuit breaker and a disconnector, and control operation of a water depressing system, the circuit breaker configured to cause a connection of the variable-speed generator-motor to an electric power system, and the disconnector configured to cause a three-phase short-circuit at a stator winding terminal of the variable-speed generator-motor; and a secondary exciter control unit including a comparison unit, a self-start control unit, and a pair of switches configured to control output to the secondary exciter;

wherein the secondary exciter control unit is configured to control:

supply of driving electricity to the secondary winding of the variable-speed generator-motor from the secondary exciter to thereby start the variable-speed generator-motor from a standstill state; and completion of a start-up of the variable-speed generator-motor by controlling the driving electricity from the secondary exciter and connecting the variable-speed generator-motor in parallel with the electric power system, in a state where a rotating speed of the variable-speed generator-motor is lower than a lower limit speed of a variable-speed operation range that is defined as a range allowing stable continuous operation; and wherein the controller is configured to:

open the circuit breaker and close the disconnector such that the variable-speed generator-motor serves as an induction motor;

execute a self-start mode to accelerate and start the variable-speed generator-motor; and when a rotating speed of the variable-speed generator-motor has reached a preset value, switch a control mode from the self-start mode to a secondary excitation control mode in which the control unit performs control to open the disconnector in the state where the rotating speed of the variable-speed generator-motor is lower than the lower limit speed of the variable-speed operation range;

control the secondary exciter to synchronize a terminal voltage of the variable-speed generator-motor with the electric power system, and;

close the breaker after ascertaining the synchronization.

12. The controller of claim 11, wherein the comparison unit is configured to compare speed of a rotor of the variable-speed generator-motor with a mode-switching speed set value saved in a storage unit of the secondary exciter control unit.

* * * * *